(12) United States Patent
Chen

(10) Patent No.: US 7,563,062 B1
(45) Date of Patent: Jul. 21, 2009

(54) MILLING HEAD

(76) Inventor: Chin-Chiu Chen, No. 198, Jingpu Rd., Cingshuei Chen, Taichung Hsien (TW)

( * ) Notice: Subject to any disclaimer, the term of this patent is extended or adjusted under 35 U.S.C. 154(b) by 0 days.

(21) Appl. No.: 12/358,008

(22) Filed: Jan. 22, 2009

(51) Int. Cl.
*B23C 1/00* (2006.01)
*B23Q 11/10* (2006.01)

(52) U.S. Cl. .................. 409/230; 409/136; 409/215; 408/59; 408/60; 408/61; 408/124

(58) Field of Classification Search .............. 409/230, 409/144, 136, 135, 215; 408/59, 57, 56, 408/60, 61, 124
See application file for complete search history.

(56) References Cited

U.S. PATENT DOCUMENTS

| | | | | |
|---|---|---|---|---|
| 4,557,643 A | * | 12/1985 | Cioci | 409/136 |
| 4,598,617 A | * | 7/1986 | Kubo et al. | 408/59 |
| 4,652,189 A | * | 3/1987 | Mizoguchi | 409/136 |
| 4,708,538 A | * | 11/1987 | Kubo et al. | 408/59 |
| 4,795,293 A | * | 1/1989 | Mizoguchi | 409/136 |
| 4,981,403 A | * | 1/1991 | Katayama | 409/136 |
| 5,419,661 A | * | 5/1995 | Meachum | 408/57 |
| 5,439,333 A | * | 8/1995 | Kubo | 409/136 |
| 5,513,802 A | * | 5/1996 | Ueki | 239/571 |
| 5,697,739 A | * | 12/1997 | Lewis et al. | 409/230 |
| 6,672,809 B2 | * | 1/2004 | Senzaki | 409/136 |
| 6,939,094 B2 | * | 9/2005 | Konishi | 409/230 |
| 2006/0266557 A1 | * | 11/2006 | Estes | 175/340 |

* cited by examiner

*Primary Examiner*—Erica E Cadugan
(74) *Attorney, Agent, or Firm*—patenttm.us

(57) ABSTRACT

A milling head has a body, a holding device, a driving axle, a spraying device and a tool adaptor. The body has a base, a rear cover, a front cover, a bearing seat and a middle liner ring. The holding device is connected to the body and has a linking arm, a mounting jacket, a bottom cap, a positioning shaft and a locating spring. The driving axle is rotatably mounted in the body and has a transmission shaft and a driving bevel gear. The spraying device is mounted on the base and has a mounting cover and an spraying ball. The tool adaptor is rotatably mounted in the base below the spraying device and has a transmitting bevel gear, a holding head and a connecting segment.

9 Claims, 9 Drawing Sheets

MILLING HEAD

BACKGROUND OF THE INVENTION

1. Field of the Invention

The present invention relates to a milling head, and more particularly to a milling head, which allows a location of coolant sprayed from the milling head to be selected conveniently.

2. Description of Related Art

A conventional milling head is mounted on a milling machine and has a body, a holding device, a driving axle, a tool adaptor and a spraying device. The body of the conventional milling head is mounted on a top of the milling machine and has a sidewall, a top side and a bottom side. The holding device is detachably mounted on the sidewall, is attached to the milling machine to hold the body with the milling machine and has a bottom. The driving axle is rotatably and vertically mounted on the top side of the body and has a lower end. The tool adaptor is mounted on the bottom side of the body, is connected to the lower end of the driving axle and has an outer end to connect a milling tool so the tool adaptor can be rotated by the driving axle. The spraying device may be a coil pipe mounted on the bottom of the holding device and extends to the tool adaptor to spray coolant onto the milling tool, or may be an inner pipe mounted in the body near the driving axle to spray coolant onto the milling tool on the tool adaptor.

Although, the conventional milling head can provide a cooling effect to the milling tool by the coil pipe or the inner pipe, the coil pipe is mounted on the holding device and this obstructs operation of using the milling head. In addition, the inner pipe mounted in the body only has a single spraying direction that cannot be adjusted or changed.

The milling head in accordance with the present invention mitigates or obviates the aforementioned problems.

SUMMARY OF THE INVENTION

The main objective of the present invention is to provide a milling head, which allows location of a coolant sprayed from the milling head to be selected conveniently.

The milling head in accordance with the present invention has a body, a holding device, a driving axle, a spraying device and a tool adaptor. The body has a base, a rear cover, a front cover, a bearing seat and a middle liner ring. The holding device is connected to the body and has a linking arm, a mounting jacket, a bottom cap, a positioning shaft and a locating spring. The driving axle is rotatably mounted in the body and has a transmission shaft and a driving bevel gear. The spraying device is mounted on the base and has a mounting cover and a spraying ball. The tool adaptor is rotatably mounted in the base below the spraying device and has a transmitting bevel gear, a holding head and a connecting segment.

Other objectives, advantages and novel features of the invention will become more apparent from the following detailed description when taken in conjunction with the accompanying drawings.

DETAILED DESCRIPTION OF THE PREFERRED EMBODIMENT

Figure 1:
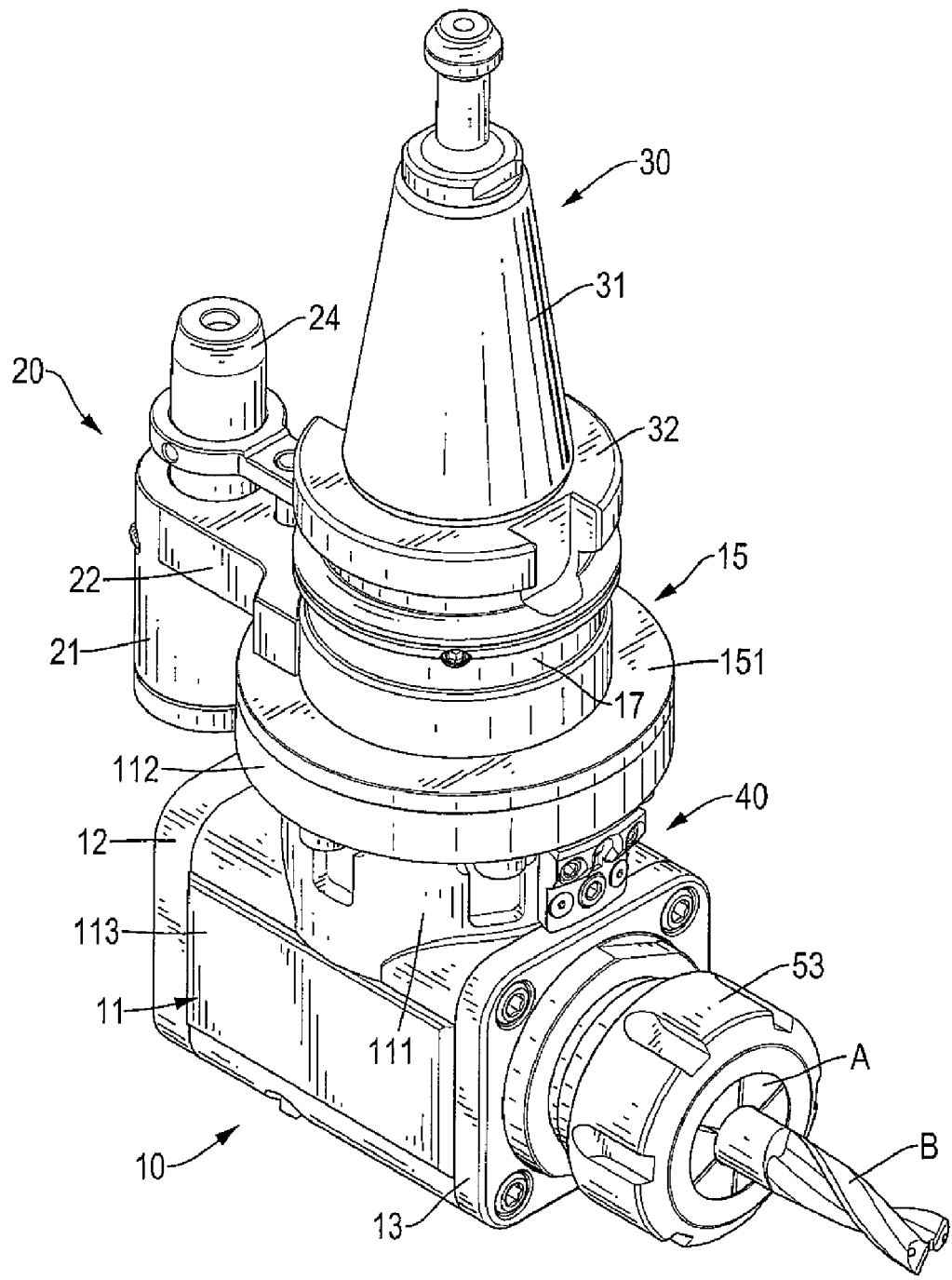
FIG. 1 is a perspective view of a milling head in accordance with the present invention.

With reference to FIGS. 1 to 9, a milling head in accordance with the present invention comprises a body (10), a holding device (20), a driving axle (30), a spraying device (40) and a tool adaptor (50).

The body (10) is securely mounted on a milling machine and has a base (11), a rear cover (12), a front cover (13), a front liner ring (14), a bearing seat (15), a middle liner ring (16) and an upper cover (17).

The base (11) is securely mounted on a top of the milling machine and has a top side, a mounting segment (111), a disk segment (112) and an interconnecting segment (113).

The mounting segment (111) is tubular, is formed on the top side of the base (11) and has a top, a bottom, a front side, a flow passage (1111), an upper hole (1112), a lower hole (1113), an inlet hole (1114) and a sealing bolt (1115).

The flow passage (1111) is vertically formed in the mounting segment (111) near the front side and has an upper end, a lower end and an inner side. The upper hole (1112) is formed through the front side of the mounting segment (111) near the upper end of the flow passage (1111) and communicates with the flow passage (1111). The lower hole (1113) is formed through the front side of the mounting segment (111) below the upper hole (1112) and communicates with the flow passage (1111). The inlet hole (1114) is formed through the inner side of the flow passage (1111) near the upper end and communicates with the flow passage (1111), the upper hole (1112) and the lower hole (1113). The sealing bolt (1115) is mounted in the upper end of the flow passage (1111).

The disk segment (112) is formed around the top of the mounting segment (111). The interconnecting segment (113) is tubular, is formed on the bottom of the mounting segment (111) and communicates with the lower end of the flow passage (1111) and has a front end and a rear end.

The rear cover (12) is mounted on the rear end of the interconnecting segment (113) of the base (11).

The front cover (13) is mounted on the front end of the interconnecting segment (113) of the base (11) and has a center and a through hole (131). The through hole (131) is formed through the center of the front cover (13).

The front liner ring (14) is mounted in the body (10) between the interconnecting segment (113) of the base (11) and the front cover (13) and has an external surface, multiple communicating holes (141) and two lower oil seals (142). The communicating holes (141) are formed through the external surface of the front liner ring (14) at intervals and communicate with the flow passage (1111) of the base (11). The lower oil seals (142) are mounted in the base (11) and are abuts respectively with two sides of the front liner ring (14) between the base (11) and the front cover (13).

The bearing seat (15) is mounted in the mounting segment (111) of the base (11), abuts the disk segment (112) of the base (11) and has a bottom end, a top end, an external surface, an internal surface, a middle, a connecting disk (151), an annular groove (152), a guide channel (153), a connecting hole (154), two mounting holes (155), two upper oil seals (156) and two bearings (157).

The bottom of the bearing seat (15) is mounted in the mounting segment (111) of the base (11). The connecting disk (151) is formed around the external surface of the bearing seat (15) near the middle and is connected securely to the disk segment (112) of the base (11). The annular groove (152) is formed around the external surface of the bearing seat (15) below the connecting disk (151) and communicates with the inlet hole (1114) of the base (11). The guide channel (153) is formed in the bearing seat (15) and has an upper end and a lower end. The upper end of the guide channel (153) is formed through the bearing seat (15) above the connecting disk (151). The lower end of the guide channel (153) is formed through the bearing seat (15) and communicates with the annular groove (152). The connecting hole (154) is formed in the internal surface of the bearing seat (15) and communicates with the guide channel (153). The mounting holes (155) are respectively formed through the top end and the bottom end of the bearing seat (15) and communicate with each other. The upper oil seals (156) are respectively mounted in the internal surface of the bearing seat (15) near the top end and the bottom end. The bearings (157) are respectively mounted in the ends of the bearing seat (15) and abut the upper oil seals (156).

The middle liner ring (16) is rotatably mounted in the bearing seat (15), abuts the upper oil seals (156) and the bearings (157) and has an external surface, a middle, an outer groove (161), three drain holes (162) and three threaded holes (163). The outer groove (161) is formed around the external surface of the middle liner ring (16) near the middle and communicates with the connecting hole (154) of the bearing seat (15). The drain holes (162) are radially formed through the external surface of the middle liner ring (16) in the outer groove (161) at intervals. The threaded holes (163) are formed through the external surface of the middle liner ring (16) between the drain holes (162).

The upper cover (17) is mounted around the top end of the bearing seat (15).

The holding device (20) is connected to the milling machine and the body (10) and has a linking arm (22), a mounting jacket (21), a bottom cap (23), a positioning shaft (24) and a locating spring (25).

The linking arm (22) is connected to the bearing seat (15) above the connecting disk (151) and has a front end, a rear end and a flow channel (221). The front end of the linking arm (22) is connected to the external surface of the bearing seat (15). The flow channel (221) is formed in the linking arm (22) and has a front end and a rear end. The front end of the flow channel (221) communicates with the upper end of the guide channel (153) of the bearing seat (15).

The mounting jacket (21) is formed on the rear end of the linking arm (21) and has a top, a bottom, a mounting recess (212) and a pin hole (211). The mounting recess (212) is formed in the mounting jacket (21) and communicates with the rear end of the flow channel (221) of the linking arm (22). The pin hole (211) is formed transversely in the inner surface of the mounting jacket (21) at a position opposite to the linking arm (22) and communicates with the mounting recess (212).

The bottom cap (23) is mounted on the bottom of the mounting jacket (21).

The positioning shaft (24) is movably mounted in the mounting jacket (21) and has an outer end, an inner end, an external surface, a chamber (241), a flange (242), an inner tube (243), a pressing spring (245), a closed ball (244), a sliding recess (246) and a positioning pin (247). The outer end of the positioning shaft (24) extends out of the top of the mounting jacket (21). The inner end of the positioning shaft (24) is mounted in the mounting recess (212) of the mounting jacket (21). The chamber (241) is formed in the positioning shaft (24) and communicates with the mounting recess (212) of the mounting jacket (21). The flange (242) is formed in the outer end of the positioning shaft (24). The inner tube (243) is mounted in the chamber (241) of the positioning shaft (24) near the inner end. The pressing spring (245) is mounted in the chamber (241) between the flange (242) and the inner tube (243). The closed ball (244) is mounted in the chamber (241) and abuts the flange (242) by the pressing spring (245). The sliding recess (246) is formed on the external surface of the positioning shaft (24) near the inner end and communicates with the pin hole (211) of the mounting jacket (21). The positioning pin (247) is mounted in the pin hole (211) of the mounting jacket (21) and extends into the sliding recess (246) to hold the positioning shaft (24) with the mounting jacket (21).

The locating spring (25) is mounted in the mounting recess (212) of the mounting jacket (21) between the inner tube (243) of the positioning shaft (24) and the bottom cap (23).

The driving axle (30) is rotatably mounted in the body (10) and has a lower end, an upper end, a transmission shaft (33), three setscrews (36), a driving bevel gear (35), a tool shank (31) and a rim (32). The transmission shaft (33) is formed on the lower end of the driving axle (30), is rotatably mounted in the bearing seat (15) between the upper oil seals (156), the bearings (157) and the middle liner ring (16) and has an external surface, a lower end, an inner groove (331) and three inserting holes (332). The inner groove (331) is formed on the external surface of the transmission shaft (33) and communicates with the drain holes (162) of the middle liner ring (16). The inserting holes (332) are formed through the external surface of the transmission shaft (33) in the inner groove (331) and respectively align with the threaded holes (163) of the middle liner ring (16).

The setscrews (36) are respectively mounted in the threaded holes (163) of the middle liner ring (16) and extend into the inserting holes (332) of the transmission shaft (33). Then, the middle liner ring (16) can be rotated relative to the bearing seat (15) by the transmission shaft (33).

The driving bevel gear (35) is mounted on the lower end of the transmission shaft (33) and is mounted rotatably in the bearing seat (15).

The tool shank (31) is formed on the upper end of the driving axle (30) and has a center, a top a draft channel (34) and three outlet holes (341). The draft channel (34) is formed in the center of the tool shank (31) from the top of the tool shank (31) to the transmission shaft (33) at a position corresponding to the inner groove (331). The outlet holes (341) are formed through the transmission shaft (33) in the inner groove (331), communicate with the draft channel (34) and respectively align with the drain holes (162) of the middle liner ring (16).

The rim (32) is formed around the driving axle (30) between the transmission shaft (33) and the tool shank (31) and abuts the upper cover (17) of the body (10).

The spraying device (40) is mounted on the base (11) of the body (10) and has a mounting cover (41), two gasket rings (42), a spraying ball (43), an adjusting valve (44) and an engaging rod (45).

The mounting cover (41) is securely mounted on the front side of the mounting segment (111) of the base (10) to cover the upper hole (1112) and the lower hole (1113) of the mounting segment (111) and has a top, a bottom, a front face, a rear face, a ball recess (411), an outlet (412), an adjusting hole (413), a valve recess (414) and a rod recess (415). The ball recess (411) is formed in the rear face of the mounting cover (41) near the top and communicates with the upper hole (1112) of the mounting segment (111). The outlet (412) is formed through the front face of the mounting cover (41) and communicates with the ball recess (411). The adjusting hole (413) is formed through the front face of the mounting cover (41) near the bottom. The valve recess (414) is formed in the rear face of the mounting cover (41) and communicates with the adjusting hole (413) and the lower hole (1113) of the mounting segment (111). The rod recess (415) is formed in the rear face of the mounting cover (41) above the valve recess (414).

The gasket rings (42) are respectively mounted between the upper hole (1112) and the lower hole (1113) of the mounting segment (111) of the base (11) and the ball recess (411) and the valve recess (414) of the mounting cover (41).

The spraying ball (43) is mounted between the ball recess (411) of the mounting cover (41) and the upper hole (1112) of the mounting segment (111) and has a rear side, a front side, a ball hole (431) and a spraying hole (432). The ball hole (431) is formed in the rear side of the spraying ball (43) and communicates with upper hole (1112) and the flow passage (1111) of the mounting segment (111). The spraying hole (432) may be a threaded hole, is obliquely formed in the front side of the spraying ball (43) and communicates with the ball hole (431) and the outlet (412) of the mounting cover (41).

The adjusting valve (44) is rotatably mounted between the valve recess (414) of the mounting cover (41) and the lower hole (1113) of the mounting segment (111) and has an inner end, an outer end, a middle, a valve hole (441), a rotating ring (442), an engaging recess (443) and a hexagonal hole (444). The inner end of the adjusting valve (44) is mounted in lower hole (1113) of the mounting segment (111) and extends into the flow passage (1111). The outer end of the adjusting valve (44) is mounted in the adjusting hole (413) of the mounting cover (41). The valve hole (441) is radially formed through the inner end of the adjusting valve (44) and communicates with the flow passage (1111). The rotating ring (442) is formed around the adjusting valve (44) near the middle and abuts the mounting cover (41) in the valve recess (414) and has a top. The engaging recess (443) is curved and formed along the top of the rotating ring (442) and communicates with the rod recess (415). The hexagonal hole (444) is formed in the outer end of the adjusting valve (44).

The engaging rod (45) is mounted securely in the rod recess (415) of the mounting cover (41) and extends into the engaging recess (443) of the adjusting valve (44). With the abutment of the engaging rod (45) with one end of the engaging recess (443), the rotating angle of the adjusting valve (44) relative to the mounting cover (41) can be limited to a specific angle, such as at a right angle.

The tool adaptor (50) is rotatably mounted in the base (11) below the spraying device (40) and has an inner end, an outer end, a transmitting bevel gear (54), a holding head (51), a connecting segment (52) and a mounting nut (53). The inner end of the tool adaptor (50) is rotatably mounted in the interconnecting segment (113) of the base (11) between the lower oil seals (142), the rear cover (12) and the front cover (13). The outer end of the tool adaptor (50) extends out of the through hole (131) of the front cover (13). The transmitting bevel gear (54) is mounted around the tool adaptor (50) near the inner end and engages the driving bevel gear (35) of the driving axle (30) so the tool adaptor (50) can be rotated relative to the base (10) by the driving axle (30). The holding head (51) is formed on the outer end of the tool adaptor (50) and has a free end.

The connecting segment (52) is formed with the holding head (51), is mounted in the base (11) and has an external surface, a bell mouth (521) and multiple injecting holes (522). The bell mouth (521) is formed in the free end of the holding head (51) to mount around a collet (A). The injecting holes (522) are formed through the external surface of the connecting segment (52) near the front liner ring (14) and communicate with the bell mouth (521) and the communicating holes (141).

The mounting nut (53) is mounted around the free end of the holding head (51) to hold the collet (A) with the holding head (51).

Figure 2:
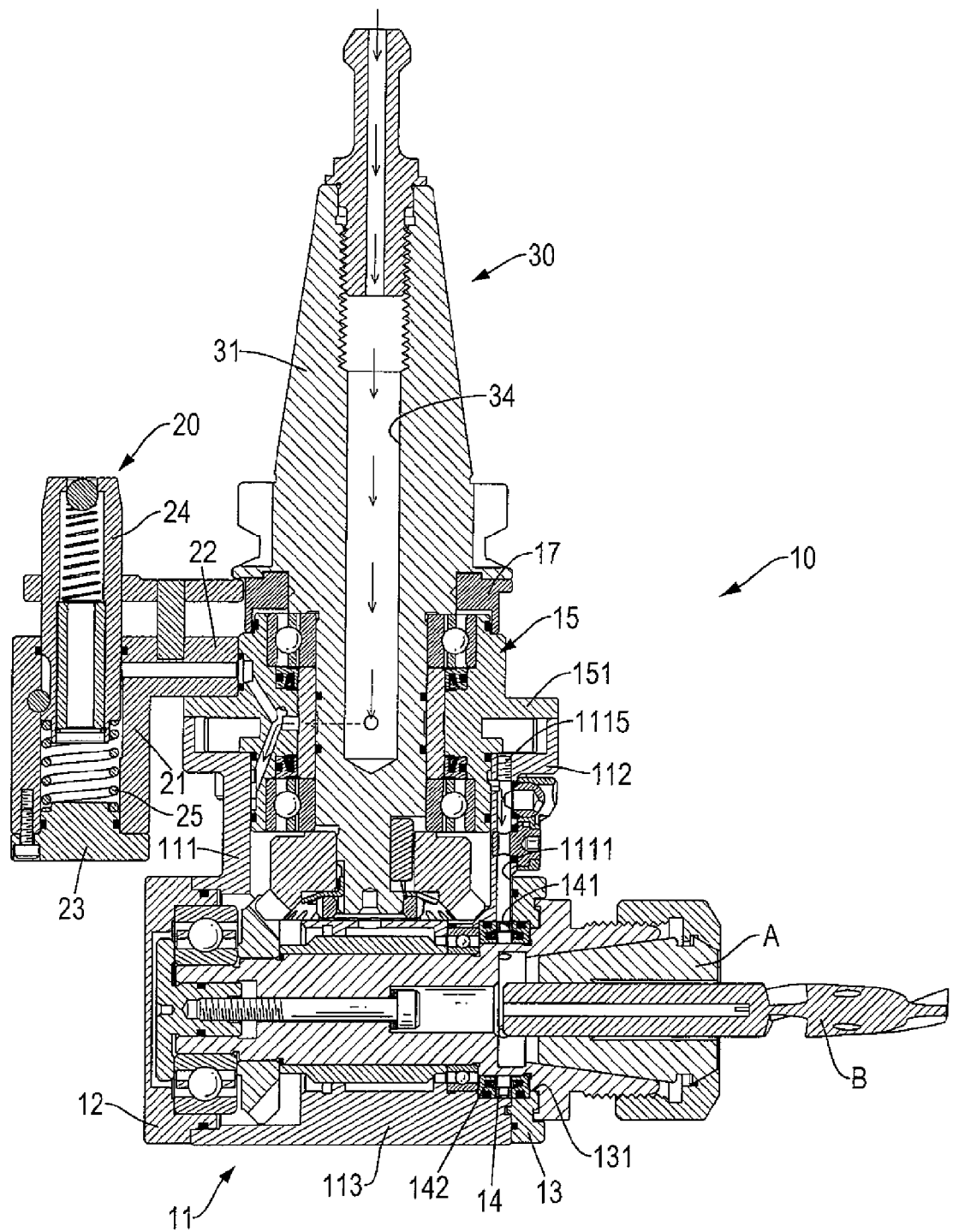
FIG. 2 is a side view in partial section of the milling head in FIG. 1.
Figure 3:
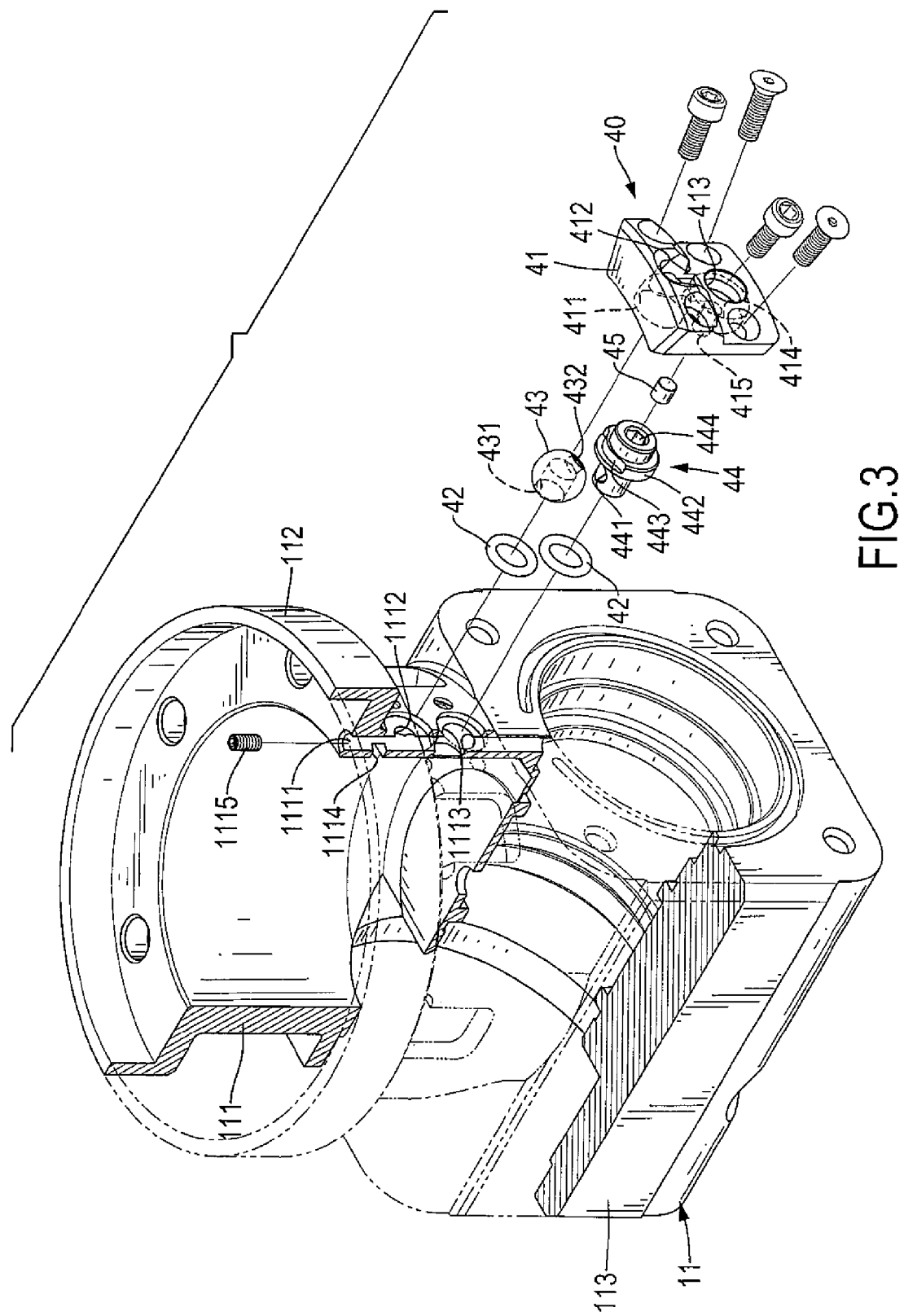
FIG. 3 is an enlarged, exploded, perspective view in partial section of a spraying device of the milling head in FIG. 1.

With further reference to FIGS. 1 and 2, when using the milling head to mill an object, the milling head is mounted securely on a milling machine, the tool shank (31) is driven by the milling machine and the positioning shaft (24) is pressed against the milling machine to provide a locating effect for the body (10). A collet (A) is mounted securely in the holding head (51) by the mounting nut (53) 12 and a milling tool (B) is clamped in the collet to mill the object. When the driving axle (30) is rotated by the milling machine, the tool adaptor (50) will be rotated with the driving axle (30) by the driving bevel gear (35) engaging the transmitting bevel gear (54). Then, the milling tool (B) can be rotated to mill the object.

While the milling tool (B) mills the object, a coolant such water or the like in the milling machine can flow into the milling head in accordance with the present invention by two modes. One mode is injecting the coolant into the driving axle (30) and the other mode is filling the coolant into the holding device (20).

With reference to FIGS. 2, 5 to 8, when the coolant is injected into the draft channel (34) of the driving axle (30), the coolant will flow in the inlet hole (1114) of the flow passage (1114) of the mounting segment (111) via the outlet holes (341) of the driving axle (30), the drain holes (162) and the outer groove (161) of the middle liner ring (16), the connecting hole (154), the guide channel (153) and the annular groove (152) of the bearing seat (15).

Figure 4:
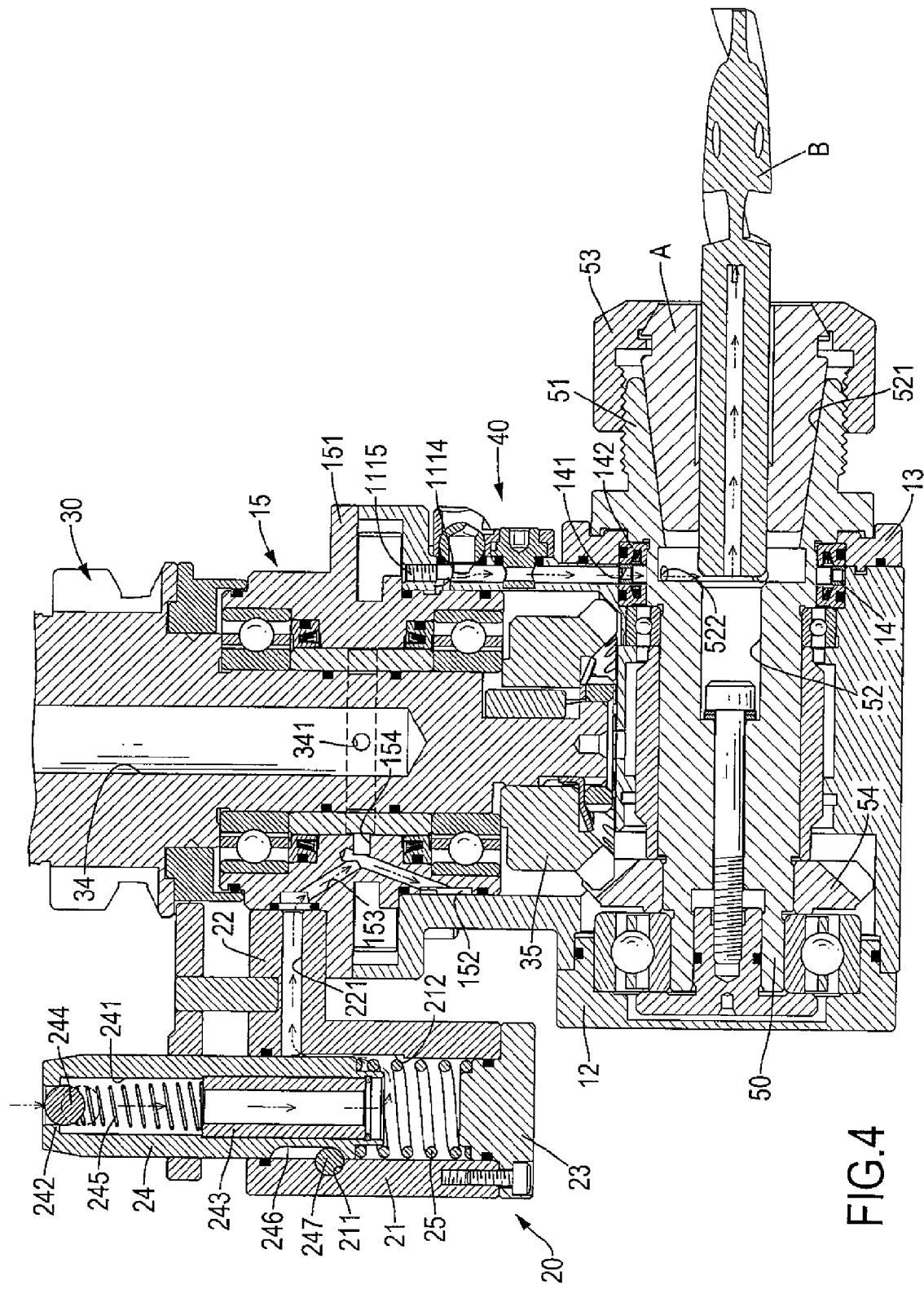
FIG. 4 is another enlarged side view in partial section of the milling head in FIG. 3.
Figure 5:
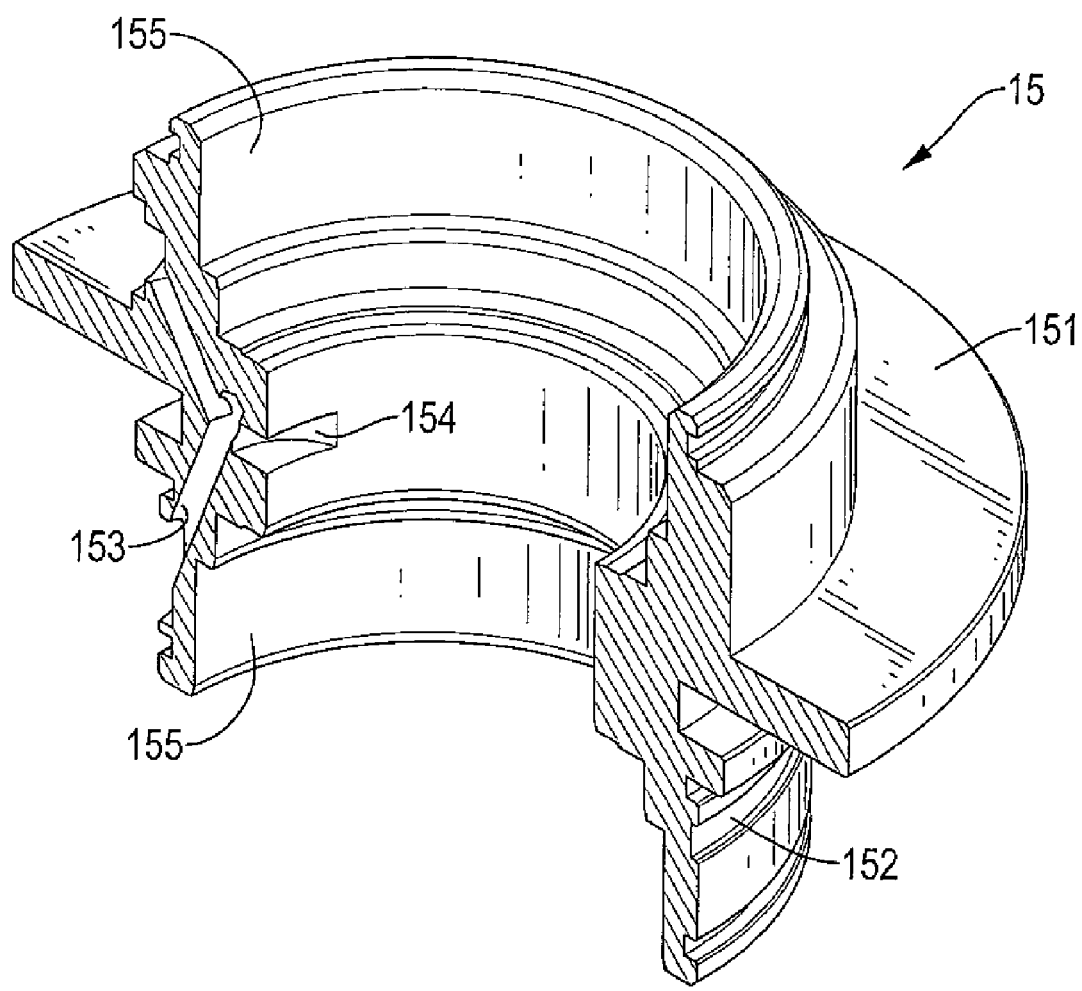
FIG. 5 is an enlarged, cross sectional perspective view of a bearing seat of the milling head in FIG. 1.
Figure 6:
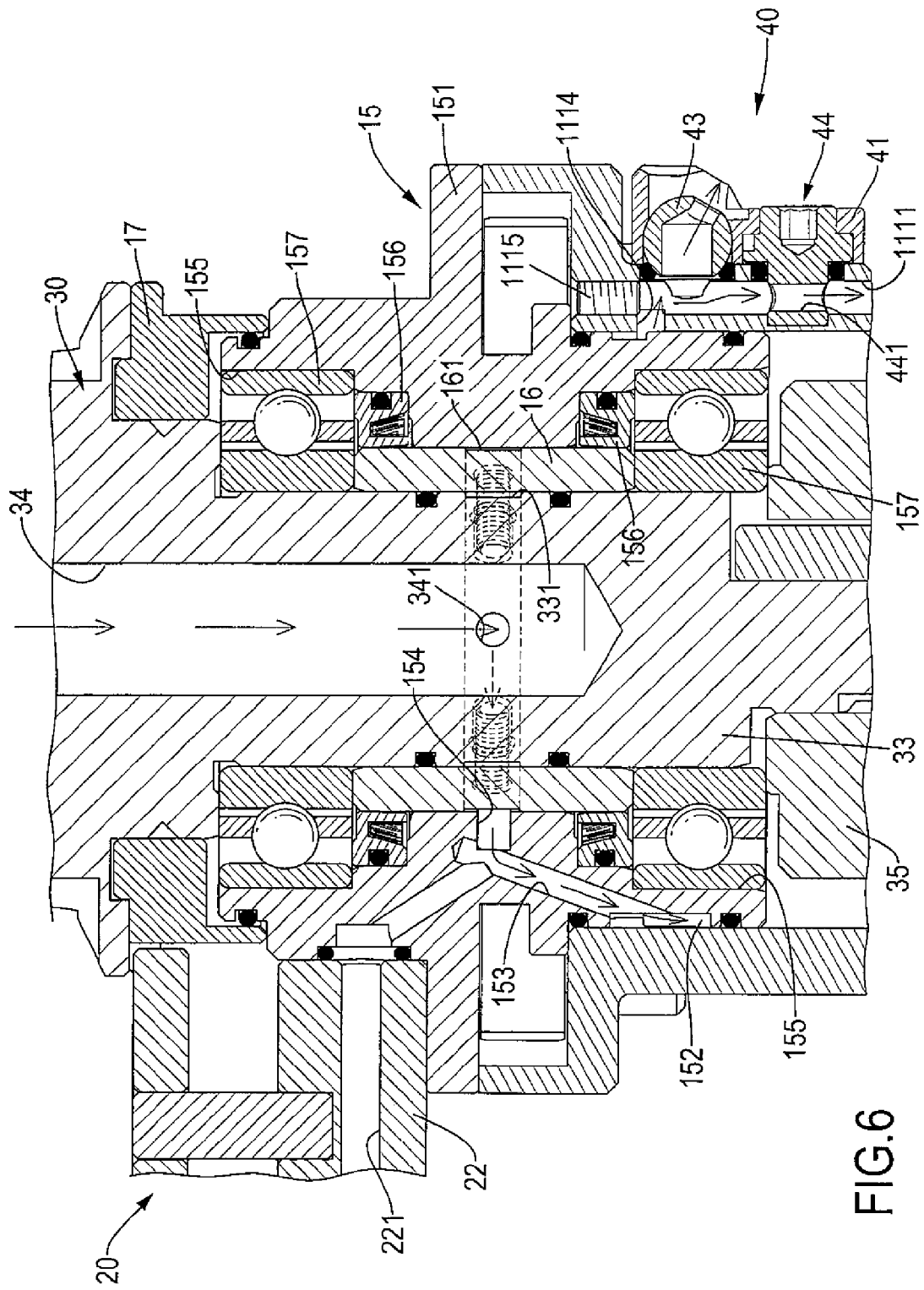
FIG. 6 is an enlarged side view in partial section of the milling head in FIG. 3.
Figure 7:
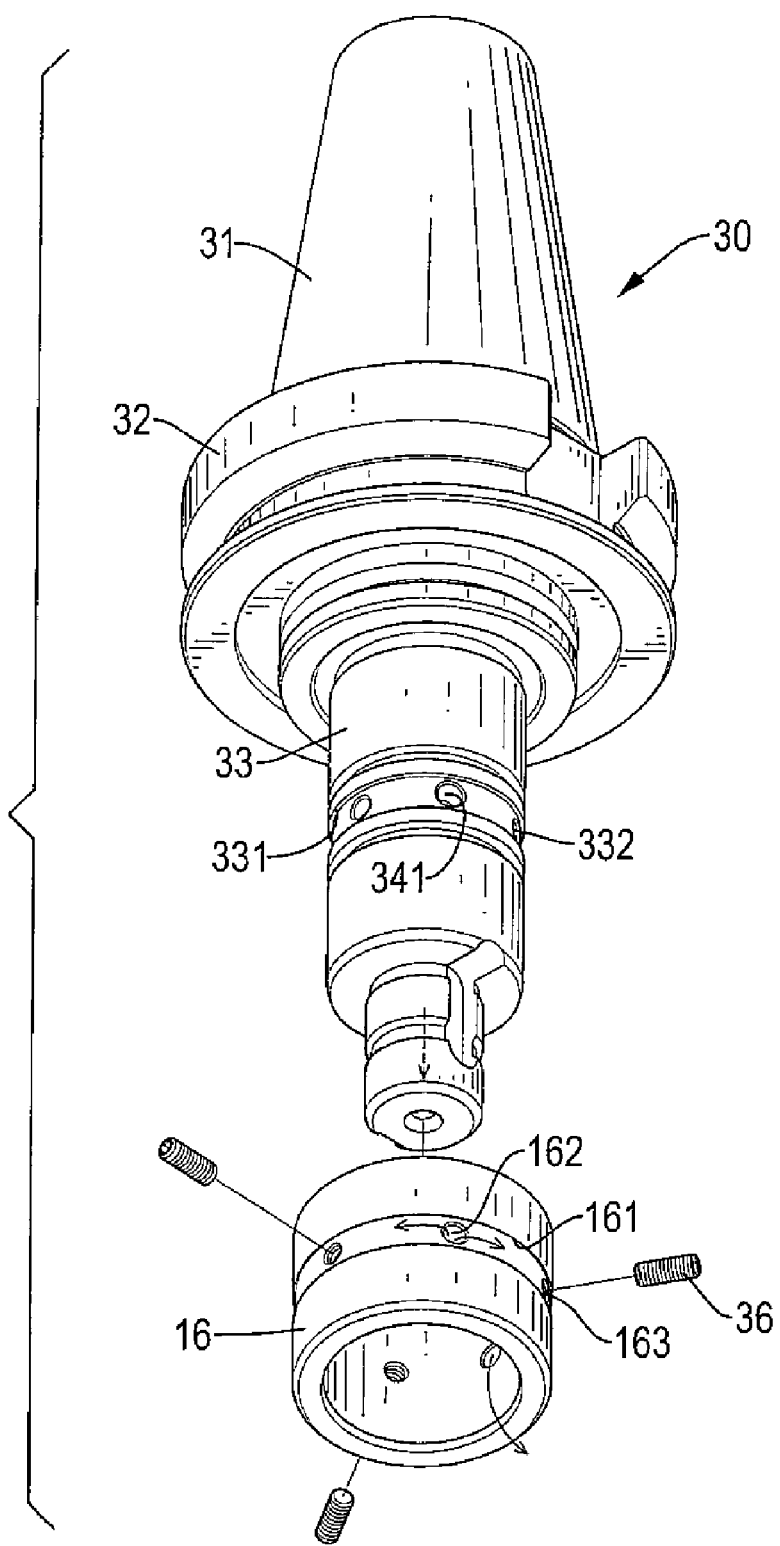
FIG. 7 is an enlarged, exploded, perspective view of a driving axle of the milling head in FIG. 1.
Figure 8:
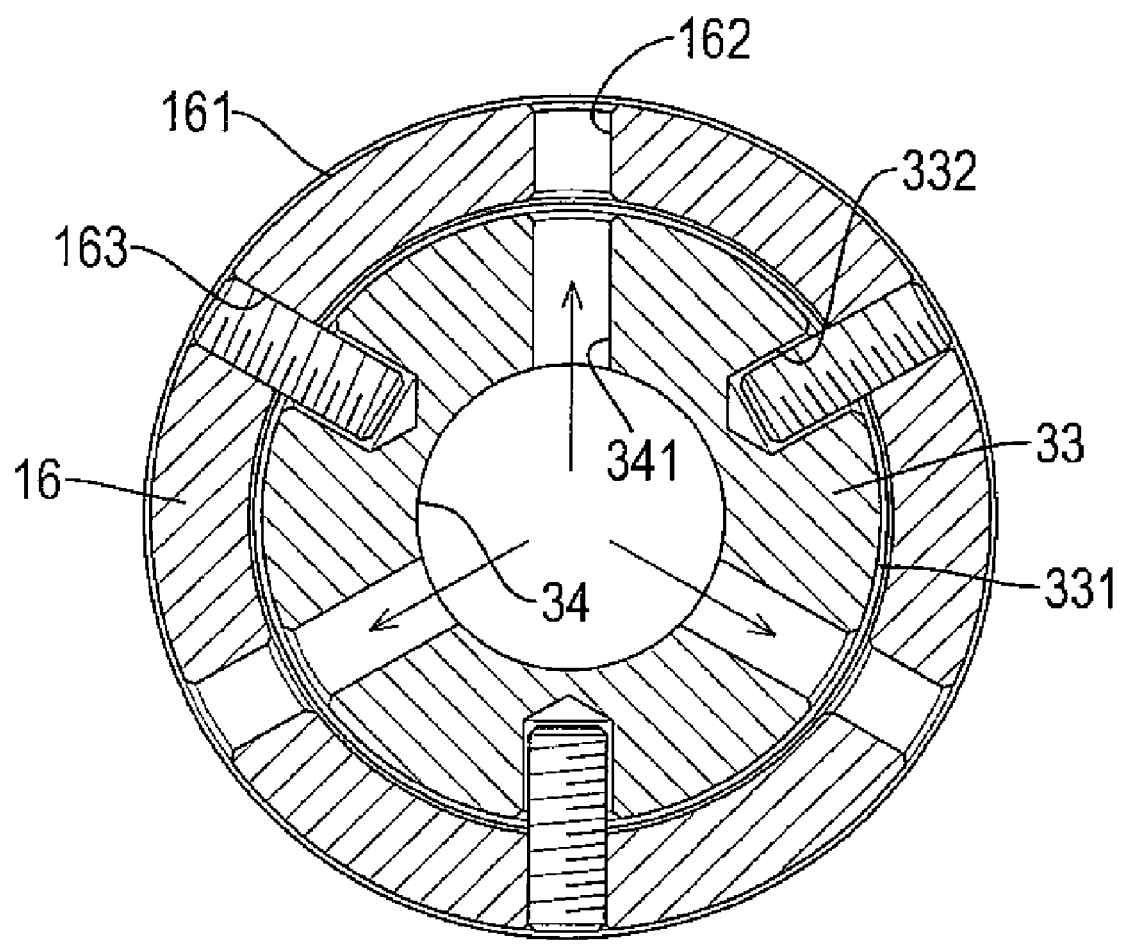
FIG. 8 is an enlarged top view in partial section of the milling head in FIG. 1.

With reference to FIG. 4, when the coolant is filed in the chamber (241) of the positioning shaft (24) by pressing the closed ball (244) from the flange (242), the coolant will flow in the inlet hole (1114) of the flow passage (1114) of the mounting segment (111) via the mounting recess (212) of the mounting jacket (21), the flow channel (221) of the linking arm (22), the guide channel (153) and the annular groove (152) of the bearing seat (15).

With reference to FIGS. 1, 3, 4 and 6, when the coolant flows in the flow passage (1111), the coolant can be sprayed out of the milling head from the spraying hole (432) via the upper hole (1112) of the mounting segment (111) and the ball hole (431) of the spraying ball (43) or from a front end of the milling tool (B) via the lower oil seals (142) and the communicating holes (141) of the front liner ring (14) and the injecting holes (522) of the connecting segment (52) to cool and lubricate the milling tool (B).

Figure 9:
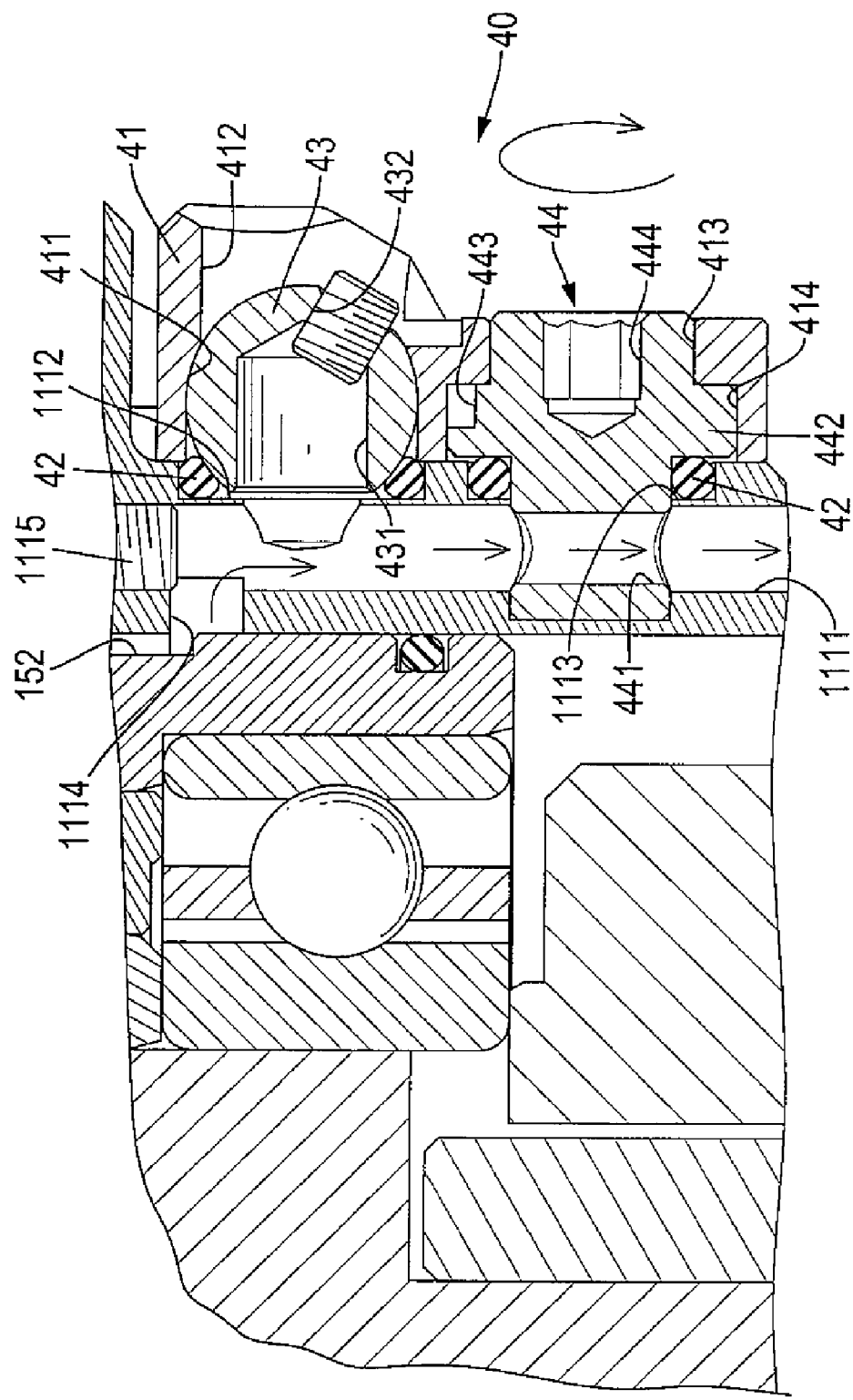
FIG. 9 is an enlarged side view in partial section of the spraying device of the milling head in FIG. 2.

Furthermore, with reference to FIG. 9, a screw bolt can be mounted in the spraying hole (432) of the spraying ball (43), then the coolant will spray out of the milling head from the milling tool (B) via the connecting segment (52) of the tool adaptor. In addition, a hexagonal wrench can also be mounted in the hexagonal hole (444) of the adjusting valve (44) to make the adjusting valve (44) rotate relative to the mounting cover (41) and the flow passage (1111) of the mounting segment (111). Then, the location of the valve hole (441) will be changed and not communicate with the flow passage (1111) of the mounting segment (111) and the coolant will spray out of the milling head from the spraying hole (432) of the spraying ball (43). Therefore, the coolant flows out of the milling head from the driving axle (30) or from the holding device (20) in accordance with the present invention and is selected conveniently.

Even though numerous characteristics and advantages of the present invention have been set forth in the foregoing description, together with details of the structure and features of the invention, the disclosure is illustrative only. Changes may be made in the details, especially in matters of shape, size, and arrangement of parts within the principles of the invention to the full extent indicated by the broad general meaning of the terms in which the appended claims are expressed.

What is claimed is:

1. A milling head having
    a body having
        a base having
            a top side;
            a mounting segment being tubular, being formed on the top side of the base and having
                a top;
                a bottom;
                a front side;
                a flow passage being vertically formed in the mounting segment near the front side and having
                    an upper end being closed;
                    a lower end; and
                    an inner side;
                an upper hole being formed through front side of the mounting segment near the upper end of the flow passage and communicating with the flow passage;
                an inlet hole being formed through the inner side of the flow passage near the upper end and communicating with the flow passage and the upper hole;
            a disk segment being formed around the top of the mounting segment; and
            an interconnecting segment being tubular, being formed on the bottom of the mounting segment and communicating with the lower end of the flow passage and having
                a front end; and
                a rear end;
        a rear cover being mounted on the rear end of the interconnecting segment of the base;
        a front cover being mounted on the front end of the interconnecting segment of the base and having
            a center; and
            a through hole being formed through the center of the front cover;
        two lower oil seals being mounted in the base between the interconnecting segment of the base and the front cover;
        a bearing seat being mounted in the mounting segment of the base and abutting the disk segment of the base and having
            a bottom end;
            a top end;
            an external surface;
            an internal surface;
            a middle;
            an annular groove being formed around the external surface of the bearing seat and communicating with the inlet hole of the base;
            a guide channel being formed in the bearing seat and having
                an upper end being formed through the bearing seat near the middle of the bearing seat; and
                a lower end being formed through the bearing seat and communicating with the annular groove;
            a connecting hole being formed in the internal surface of the bearing seat and communicating with the guide channel;
            two upper oil seals being respectively mounted in the internal surface of the bearing seat near the top end and the bottom end; and
        a middle liner ring being rotatably mounted in the bearing seat abutting the upper oil seals and having
            an external surface;
            a middle;
            an outer groove being formed around the external surface of the middle liner ring near the middle and communicating with the connecting hole of the bearing seat; and
            multiple drain holes being radially formed through the external surface of the middle liner ring in the outer groove at intervals;
    a holding device being connected to the body and having
        a linking arm being connected to the bearing seat and having
            a front end being connected to the external surface of the bearing seat;
            a rear end; and
            a flow channel being formed in the linking arm and having
                a front end communicating with the upper end of the guide channel of the bearing seat; and
                a rear end;
        a mounting jacket being formed on the rear end of the linking arm and having
            a top; and
            a bottom;
        a bottom cap being mounted on the bottom of the mounting jacket;
        a positioning shaft being movably mounted in the mounting jacket and having
            an outer end extending out of the top of the mounting jacket;
            an inner end being mounted in the mounting jacket;
            an external surface; and
            a chamber being formed in the positioning shaft; and
        a locating spring being mounted in the mounting jacket between the positioning shaft and the bottom cap;
    a driving axle being rotatably mounted in the body and having
        a lower end;
        an upper end;
        a transmission shaft being formed on the lower end of the driving axle, being rotatably mounted in the bearing seat between the upper oil seals and the middle liner ring;
        a driving bevel gear being mounted on the lower end of the transmission shaft and being mounted rotatably in the bearing seat; and
        a tool shank being formed on the upper end of the driving axle and having
            a center;
            a top;

a draft channel being formed in the center of the tool shank from the top of the tool shank to the transmission shaft; and multiple outlet holes being formed through the transmission shaft in an inner groove, communicating with the draft channel and respectively aligning with the drain holes of the middle liner ring;

a spraying device being mounted on the base of the body and having a mounting cover being securely mounted on the front side of the mounting segment of the base to cover the upper hole of the mounting segment and having a top;
a bottom;
a front face;
a rear face;
a ball recess being formed in the rear face of the mounting cover near the top and communicating with the upper hole of the mounting segment; and
an outlet being formed through the front face of the mounting cover and communicating with the ball recess; and a spraying ball being mounted between the ball recess of the mounting cover and the upper hole of the mounting segment and having a rear side;
a front side;
a ball hole being formed in the rear side of the spraying ball and communicating with the upper hole and the flow passage of the mounting segment; and
a spraying hole being obliquely formed in the front side of the spraying ball and communicating with the ball hole and the outlet of the mounting cover; and a tool adaptor being rotatably mounted in the base below the spraying device and having an inner end being rotatably mounted in the interconnecting segment of the base between the lower oil seals, the rear cover and the front cover;
an outer end extending out of the through hole of the front cover;
a transmitting bevel gear being mounted around the tool adaptor near the inner end and engaging the driving bevel gear of the driving axle; and
a connecting segment being mounted in the base and having
an external surface; and
multiple injecting holes being formed through the external surface of the connecting segment near the lower oil seals.

2. The milling head as claimed in claim 1, wherein
the bearing seat has
a connecting disk being formed around the external surface of the bearing seat near the middle and being connected securely to the disk segment of the base above the annular groove and below the upper end of the guide channel;
two mounting holes being respectively formed through the top end and the bottom end of the bearing seat and communicating with each other; and
two bearings being respectively mounted in the top end and the bottom end of the bearing seat and abutting the upper oil seals; and
the body has an upper cover mounted around the top end of the bearing seat.

3. The milling head as claimed in claim 2, wherein
the middle liner ring has multiple threaded holes formed through the external surface of the middle liner ring between the drain holes;
the transmission shaft has
an external surface;
a lower end;
the inner groove being formed on the external surface of the transmission shaft and communicating with the drain holes of the middle liner ring; and
multiple inserting holes being formed through the external surface of the transmission shaft in the inner groove and respectively aligning with the threaded holes of the middle liner ring; and
the driving axle has multiple setscrews being respectively mounted in the threaded holes of the middle liner ring and extending into the inserting holes of the transmission shaft to connect the middle liner ring with the transmission shaft.

4. The milling head as claimed in claim 3, wherein
the mounting jacket has
a mounting recess being formed in the mounting jacket and communicating with the rear end of the flow channel of the linking arm and the chamber of the positioning shaft and the inner end of the positioning shaft being mounted in the mounting recess; and
a pin hole being formed transversely in the mounting jacket opposite to the linking arm and communicating with the mounting recess; and
the positioning shaft has
a flange being formed in the outer end of the positioning shaft;
an inner tube being mounted in the chamber of the positioning shaft near the inner end;
a pressing spring being mounted in the chamber between the flange and the inner tube;
a closed ball being mounted in the chamber and abutting the flange by the pressing spring;
a sliding recess being formed on the external surface of the positioning shaft near the inner end and communicating with the pin hole of the mounting jacket; and
a positioning pin being mounted in the pin hole of the mounting jacket and extending in the sliding recess to hold the positioning shaft with the mounting jacket,
wherein the locating spring is mounted in the mounting recess of the mounting jacket between the inner tube of the positioning shaft and the bottom cap.

5. The milling head as claimed in claim 4, wherein
the mounting segment of the base has a lower hole being formed through front side of the mounting segment below the upper hole and communicating with the flow passage;
the mounting cover has
an adjusting hole being formed through the front face of the mounting cover near the bottom; and
a valve recess being formed in the rear face of the mounting cover and communicating with the adjusting hole and the lower hole of the mounting segment;
the spraying device has
two gasket rings being respectively mounted between the upper hole and the lower hole of the mounting segment of the base and the ball recess and the valve recess of the mounting cover; and
an adjusting valve being rotatably mounted between the valve recess of the mounting cover and the lower hole of the mounting segment and having an inner end being mounted in the lower hole of the mounting segment and extending into the flow passage;

an outer end being mounted in the adjusting hole of the mounting cover;

a middle;

a valve hole being radially formed through the inner end of the adjusting valve and communicating with the flow passage;

a rotating ring being formed around the adjusting valve near the middle and abutting the mounting cover in the valve recess and having a top; and a hexagonal hole being formed in the outer end of the adjusting valve.

6. The milling head as claimed in claim 5, wherein the mounting cover has a rod recess being formed in the rear face of the mounting cover above the valve recess;

the adjusting valve has an engaging recess being formed in the top of the rotating ring and communicating with the rod recess; and the spraying device has an engaging rod being mounted between the rod recess of the mounting cover and the engaging recess of the adjusting valve to engage the rotating ring in the engaging recess when the adjusting valve rotates relative to the mounting cover in a right angle.

7. The milling head as claimed in claim 6, wherein the body has a front liner ring mounted between the interconnecting segment of the base and the front cover, abutted with the lower oil seals and having an external surface; and multiple communicating holes being formed through the external surface of the front liner ring at intervals and communicating with the flow passage of the base, wherein the lower oil seals are mounted around the external surface of the front liner ring and the injecting holes of the connecting segment are formed through the external surface of the connecting segment near the front liner ring and communicating with a bell mouth and the communicating holes;

the tool adaptor has a holding head being formed on the outer end of the tool adaptor, being formed with the connecting segment and having a free end; and a mounting nut being mounted around the free end of the holding head; and the connecting segment has the bell mouth being formed in the free end of the holding head to mount around a collet.

8. The milling head as claimed in claim 7, wherein the mounting segment of the base has a sealing bolt being mounted in the upper end of the flow passage; and the spraying hole is a threaded hole.

9. The milling head as claimed in claim 8, wherein the driving axle has a rim being formed around the driving axle between the transmission shaft and the tool shank and abutting the upper cover of the body.

* * * * *